(12) United States Patent
Mine (10) Patent No.: US 9,781,331 B2
(45) Date of Patent: Oct. 3, 2017

(54) IMAGING APPARATUS, AND CONTROL METHOD THEREOF

(71) Applicant: CANON KABUSHIKI KAISHA, Tokyo (JP)

(72) Inventor: Yosuke Mine, Tama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/971,362

(22) Filed: Dec. 16, 2015

(65) Prior Publication Data

US 2016/0182812 A1 Jun. 23, 2016

(30) Foreign Application Priority Data

Dec. 19, 2014 (JP) ................................ 2014-257710

(51) Int. Cl.
| | |
|---|---|
| *H04N 5/232* | (2006.01) |
| *G06K 9/46* | (2006.01) |
| *H04N 5/225* | (2006.01) |
| *G02B 27/14* | (2006.01) |
| *G02B 27/16* | (2006.01) |

(Continued)

(52) U.S. Cl.
CPC ....... *H04N 5/23212* (2013.01); *G02B 27/144* (2013.01); *G02B 27/16* (2013.01); *G06K 9/00234* (2013.01); *G06K 9/4652* (2013.01); *H04N 5/2258* (2013.01); *H04N 5/23219* (2013.01); *H04N 9/045* (2013.01)

(58) Field of Classification Search
CPC ........... H04N 5/23212; H04N 5/23219; H04N 5/2258; H04N 3/1587; G02B 27/16; G02B 27/144; G06K 9/00228; G06K 9/4652
See application file for complete search history.

(56) References Cited

U.S. PATENT DOCUMENTS 5,168,299 A * 12/1992 Taniguchi ................ G02B 7/36
250/201.2
6,816,611 B1 11/2004 Hagiwara et al.
(Continued)

FOREIGN PATENT DOCUMENTS

| JP | H10-232934 A | 9/1998 |
| JP | 2000-48184 A | 2/2000 |
| JP | 2003-125274 A | 4/2003 |

*Primary Examiner* — Twyler Haskins
*Assistant Examiner* — Angel L Garces-Rivera
(74) *Attorney, Agent, or Firm* — Fitzpatrick, Cella, Harper & Scinto (57) ABSTRACT

Automatic focusing where variance in the focus due to a relative shift in mounted positions of sensors is suppressed is performed. An imaging apparatus including a photometric sensor and a ranging sensor includes an image data generating unit configured to generate image data by using the photometric sensor, a detection unit configured to detect a region including an object from the image data generated by the image data generating unit, a determination unit configured to divide the image data into blocks corresponding to discretely arranged ranging points of the ranging sensor, and to determine a proportion of an area occupied by the region including the object for each block, and a focusing unit configured to focus on a ranging point of the ranging sensor corresponding to a block where the area occupied by the region including the object is at a predetermined proportion or more.

8 Claims, 9 Drawing Sheets

(51) Int. Cl.
*G06K 9/00* (2006.01)
*H04N 9/04* (2006.01)

(56) References Cited

U.S. PATENT DOCUMENTS

| | | | | |
|---|---|---|---|---|
| 2011/0115893 | A1* | 5/2011 | Hayashi | H04N 7/181 348/77 |
| 2013/0308204 | A1* | 11/2013 | Fukino | G02B 7/021 359/701 |

* cited by examiner

IMAGING APPARATUS, AND CONTROL METHOD THEREOF

BACKGROUND OF THE INVENTION

Field of the Invention

The present invention relates to an imaging apparatus and a control method thereof, and more particularly, to a technology that is suitably used by an imaging apparatus that performs automatic focusing using a specific color or a face.

Description of the Related Art

A technology for automatically focusing on a main object such as a face is proposed with respect to an imaging apparatus such as a digital camera or a digital video camera. For example, Japanese Patent Application Laid-Open No. 2003-125274 proposes a technology for detecting skin color, detecting a focus area with the largest number of skin-color pixels, and focusing on the detected focus area.

SUMMARY OF THE INVENTION

A digital camera described in Japanese Patent Application Laid-Open No. 2003-125274 performs ranging and skin color detection by one image sensor. Accordingly, the focus area and a corresponding area for skin color detection coincide with each other.

However, a single-lens reflex camera generally includes, in addition to an image sensor for imaging, two sensors, a ranging sensor and a photometric sensor for performing skin color detection.

The two sensors are each adjusted with respect to a photographing lens, but since position adjustment errors occur, the two sensors are relatively shifted. Accordingly, it is difficult to cause the focus area and a corresponding area for skin color detection to coincide with each other, as in the case of Japanese Patent Application Laid-Open No. 2003-125274.

When the focus area and a corresponding skin-color area are shifted from each other, even if the number of skin-color pixels in the skin color area is accurately counted by the photometric sensor, the focus area of the ranging sensor may possibly be at a position not including skin color. There is a problem that, when focusing on the focus area described above, the focus is not on the skin color.

In view of the problem described above, the present invention has its aim to perform, by an imaging apparatus for automatically focusing on a specific color or a face by two sensors, a photometric sensor and a ranging sensor, automatic focusing where variance in the focus due to a relative shift in the mounted positions of the sensors is suppressed.

According to an aspect of the present invention, an imaging apparatus including a photometric sensor and a ranging sensor, the apparatus comprises: an image data generating unit configured to generate image data by using the photometric sensor; a detection unit configured to detect a region including an object from the image data generated by the image data generating unit; a determination unit configured to divide the image data into blocks corresponding to discretely arranged ranging points of the ranging sensor, and to determine a proportion of an area occupied by the region including the object for each block; and a focusing unit configured to focus on a ranging point of the ranging sensor corresponding to a block where the area occupied by the region including the object is at a predetermined proportion or more.

According to the present invention, automatic focusing may be performed by an imaging apparatus for automatically focusing on a specific color or a face by two sensors, a photometric sensor and a ranging sensor, where variance in the focus due to a relative shift in the mounted positions of the sensors is suppressed.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
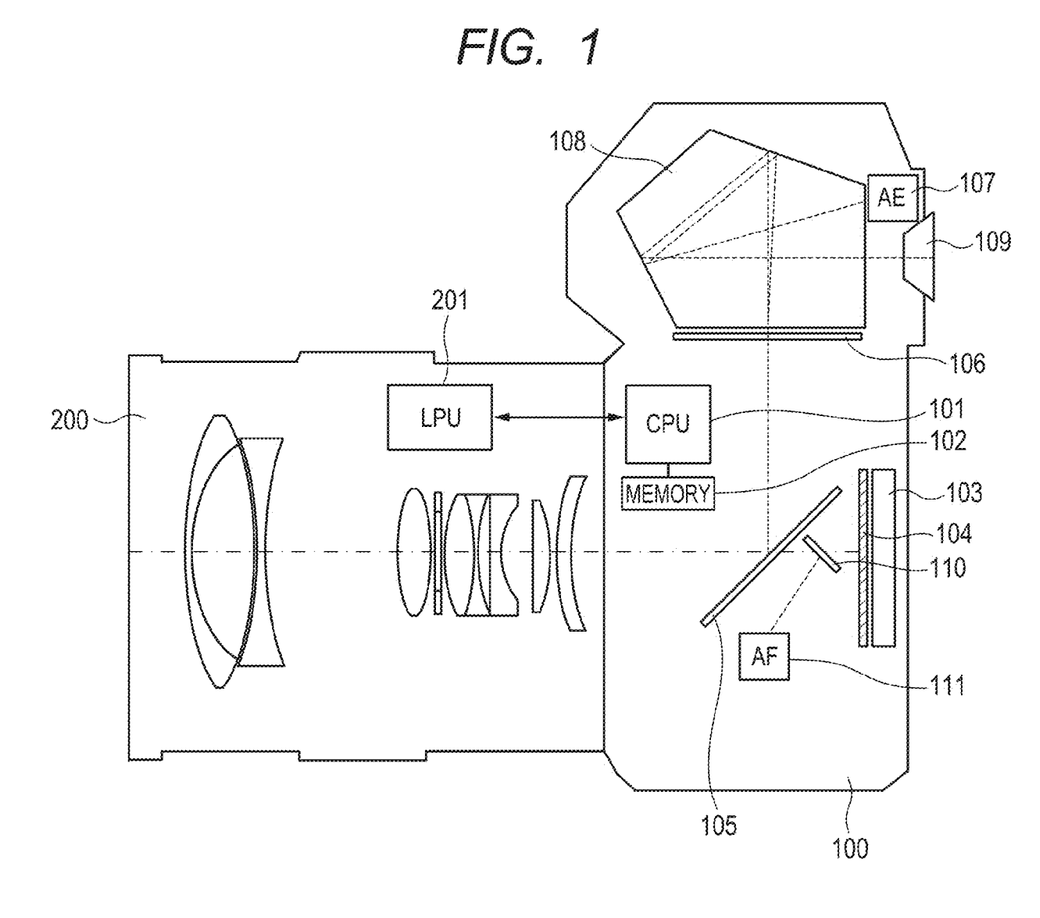
FIG. 1 is a block diagram illustrating an example structure of an imaging apparatus according to an embodiment of the present invention.

FIG. 1 is a block diagram illustrating an example structure of an imaging apparatus according to a first embodiment of the present invention.

In FIG. 1, the reference numeral 100 indicates the main body of a camera, and the reference numeral 200 indicates a lens.

First, structures of inside the camera 100 and the lens 200 will be described.

The reference numeral 101 is a camera microcomputer (hereinafter referred to as "CPU") for controlling each section of the camera 100.

The reference numeral 102 is a memory, such as a RAM or a ROM, which is connected to the CPU 101.

The reference numeral 103 is an imaging device such as a CCD or a CMOS including an infrared cut filter, a low-pass filter or the like, and an image of an object is formed thereon by the lens 200 at the time of photographing.

The reference numeral 104 is a shutter, and it blocks light to the imaging device 103 at the time of non-photographing, and guides light beams to the imaging device 103 by opening at the time of photographing.

The reference numeral 105 is a half mirror, and it reflects a part of light entering from the lens 200 at the time of non-photographing, and forms an image on a focusing plate 106.

The reference numeral 107 is a photometric sensor, and it performs object recognition processing such as photometric calculation, face detection calculation, or tracking calculation by using an imaging device such as a CCD or a CMOS including pixels each being sensitive to any of R, G and B.

The reference numeral 108 is a pentaprism, and it guides an object image on the focusing plate 106 to the photometric sensor 107 and an optical viewfinder 109. The photometric sensor 107 sees the object image that is formed on the focusing plate 106 through the pentaprism from an oblique position.

The reference numeral 110 is an AF mirror, and it guides a part of light beams which have entered from the lens 200 and passed through the half mirror 105 to a ranging sensor 111 inside a focal point detection circuit, and performs ranging.

The reference numeral 201 is a CPU (hereinafter referred to as "LPU") inside the lens 200, which transmits information about the distance to an object and the like to the CPU 101, which is a camera microcomputer.

Heretofore, the structural diagram in FIG. 1 of a camera system according to an embodiment of the present invention has been described.

Figure 2:
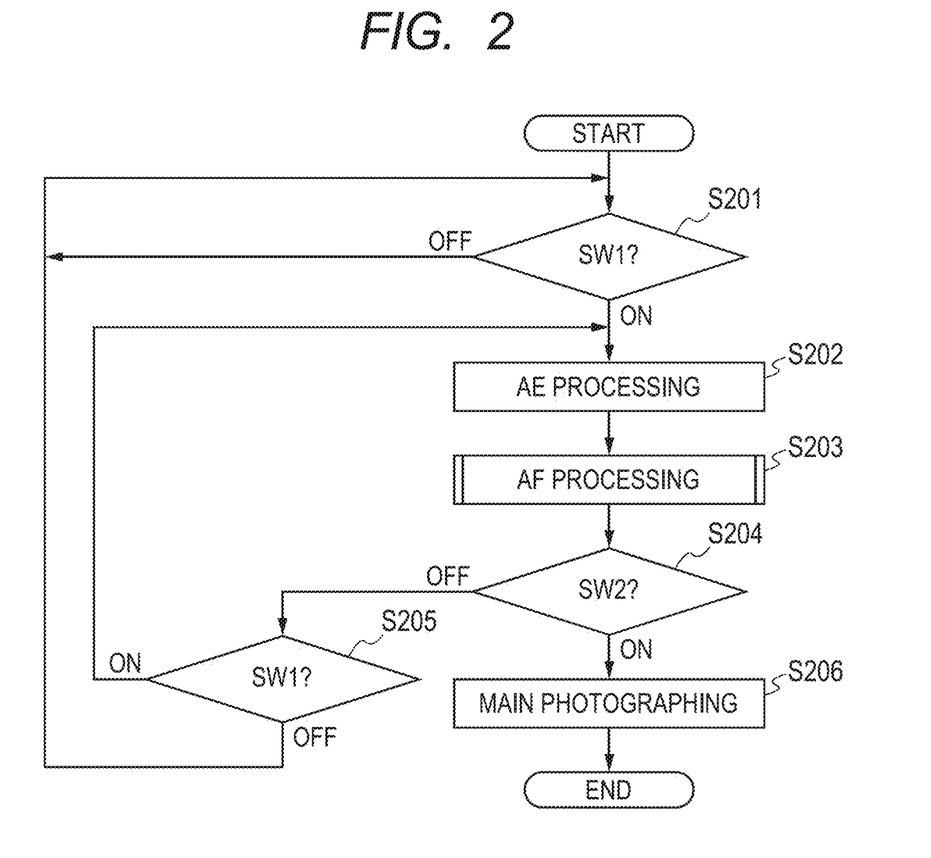
FIG. 2 is a flow chart for describing photographing processing by the imaging apparatus according to the embodiment of the present invention.
Figure 3:
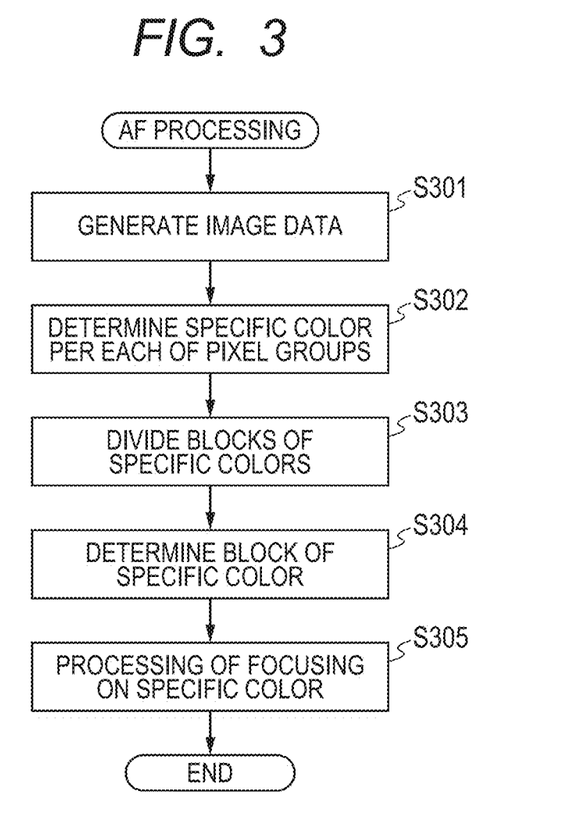
FIG. 3 is a flow chart for describing in detail driving of a photometric sensor and a ranging sensor at the imaging apparatus according to the embodiment of the present invention.

Next, an operation of the camera 100 will be described with reference to the flow charts in FIGS. 2 and 3. The processes of the flow charts in FIGS. 2 and 3 are realized by the CPU 101 loading programs recorded in the memory 102 into a working memory area of the memory 102 and executing the programs, and controlling each section of the camera 100. Additionally, in the present embodiment, it is assumed that the power of the camera 100 is on, and the camera 100 is in an imaging standby state.

In S201, the CPU 101 determines whether a first stroke of a shutter switch (hereinafter referred to as "SW1") is on or off, and in the case of on, the CPU 101 proceeds to S202.

In S202, the CPU 101 drives the photometric sensor 107, and performs object recognition processing such as photometric calculation, face detection calculation, or tracking calculation.

In S203, the CPU 101 performs AF (auto-focus) processing according to a phase difference method by using the photometric sensor 107 and the ranging sensor 111. The photometric sensor 107 detects a specific color or a face, and detects the de-focusing quantity of a ranging point where the specific color or the face is. Next, a focus lens of the lens 200 is driven through the LPU 201, and the focus lens is driven to a detected defocus position. Additionally, details of the AF processing method will be given later with reference to FIGS. 5A to 5H, and FIGS. 8A to 8H.

In S204, the CPU 101 determines whether a second stroke of the shutter switch (hereinafter referred to as "SW2") is on or off. If the shutter switch SW2 is off, the CPU 101 checks the state of the shutter switch SW1 in S205, and if it is still on, the process is returned to S202, and if it is off, the process is returned to S201.

If the SW2 is on in S204, the CPU 101 performs, in S206, main photographing processing based on an exposure control value that is calculated by using a photometric value obtained by the driving of the photometric sensor in S202. In the main photographing processing, the CPU 101 performs development processing on image data generated by the imaging device 103, and a storage medium, not illustrated, records the image data which has been subjected to the development processing. Additionally, in the case where it is selected by a user to record image data in a RAW format, the storage medium, not illustrated, records image data generated by the imaging device 103 without the CPU 101 performing the development processing.

FIG. 3 is a flow chart for describing in detail driving of the photometric sensor 107 and the ranging sensor in the AF processing in S203 in FIG. 2. The flow chart in FIG. 3 will be described with reference to FIGS. 4A to 4H, and FIGS. 5A to 5H.

Figure 4A:
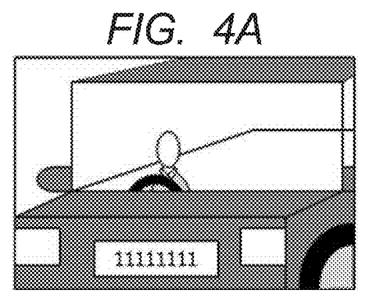
FIGS. 4A, 4B, 4C, 4D, 4E, 4F, 4G and 4H are explanatory diagrams for describing the flow chart in FIG. 3 for the imaging apparatus according to the embodiment of the present invention.
Figure 5A:
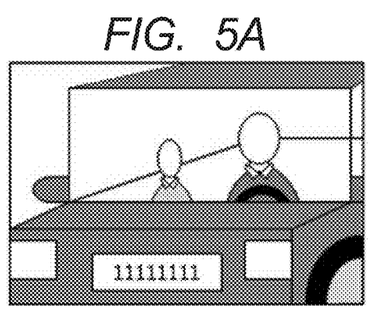
FIGS. 5A, 5B, 5C, 5D, 5E, 5F, 5G and 5H are explanatory diagrams for describing the flow chart in FIG. 3 for the imaging apparatus according to the embodiment of the present invention.

FIGS. 4A and 5A are diagrams illustrating examples of a photography scene.

Figure 4B:
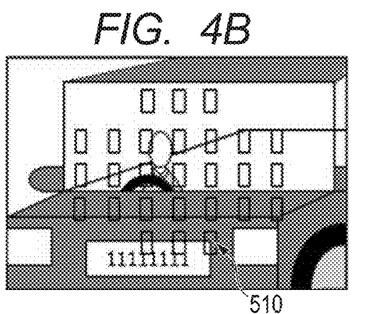
Figure 5B:
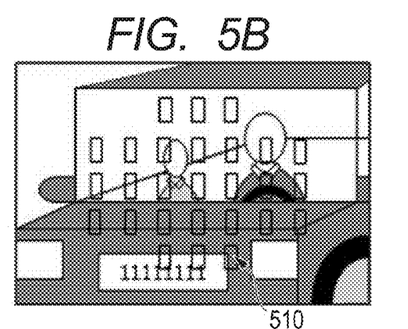

Discretely arranged ranging points 510 of the ranging sensor 111 are illustrated in FIGS. 4B and 5B with respect to the photography scenes in FIGS. 4A and 5A.

In S301, the CPU 101 performs image data generation processing of performing accumulation for the photometric sensor 107, generating image data, and storing the same in the memory 102.

In S302, the CPU 101 performs interpolation processing so that each pixel of the photometric sensor 107 has a signal according to the sensitivity for R, G or B, and divides the image data into a plurality of pixel groups each including a plurality of pixels. Specific color determination processing of obtaining the mean values of R, G and B for each pixel group, and determining whether the pixel group includes a specific color, such as skin color, based on the ratio of the mean values of R, G and B of the pixel group is performed. Additionally, the method of determining a specific color, such as skin color, is not directly relevant to the present invention, and any arbitrary method may be adopted, and thus details of the method are omitted.

Figure 4C:
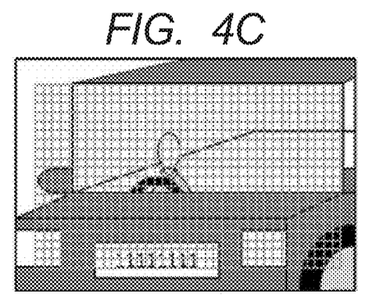
Figure 4D:
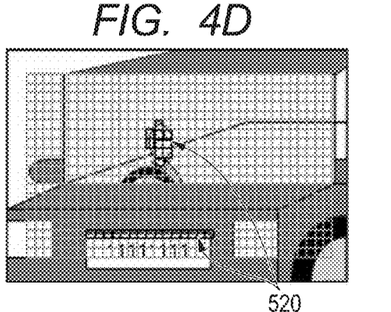
Figure 5C:
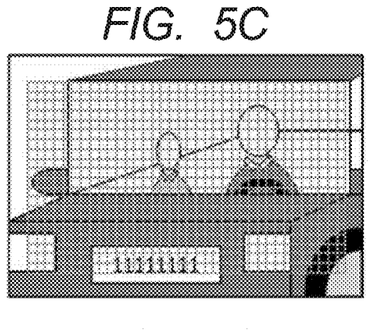
Figure 5D:
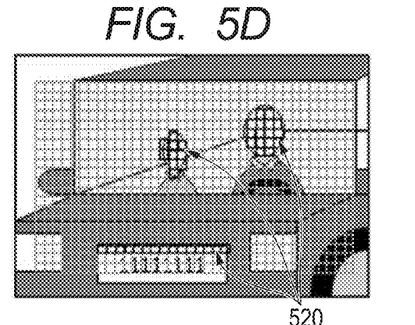

FIGS. 4C and 5C illustrate division into pixel groups, and FIGS. 4D and 5D illustrate specific color pixel groups 520 which have been determined to be of the specific color.

In S303, the CPU 101 divides the pixel groups into blocks corresponding to the ranging points of the ranging sensor 111, and counts the number of the specific color pixel groups for each block. Additionally, the size of the pixel group is to be sufficiently smaller than the size of the block corresponding to the ranging point.

Figure 4E:
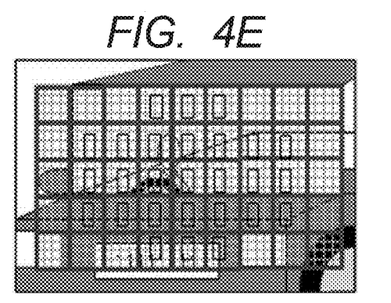
Figure 4F:
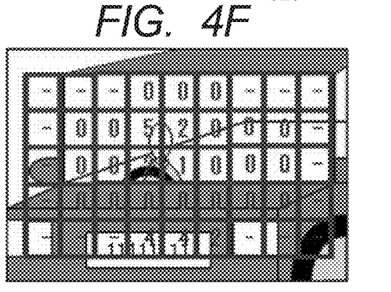
Figure 5E:
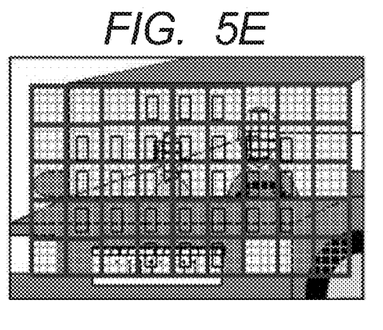
Figure 5F:
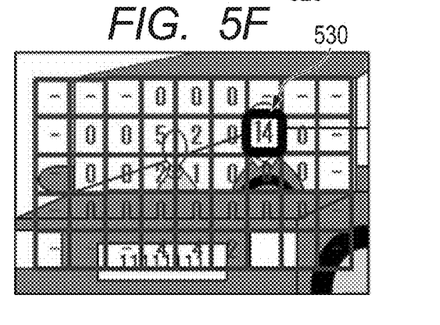

In FIGS. 4E and 5E, the pixel groups are divided into blocks corresponding to the ranging points of the ranging sensor 111. Sixteen pixel groups are contained in one block. In FIGS. 4F and 5F, the specific color pixel groups in the blocks are counted.

In S304, the CPU 101 performs specific color block determination processing of comparing the number of counts calculated in S303 and a threshold, and determining whether a block is a block including the specific color. This determination is performed by determining whether the area occupied by the specific color pixel groups in the block is at or greater than a predetermined proportion.

In FIG. 5F, a block whose number of counts is 12 (75%) or more is detected as a specific color block 530 including the specific color.

Here, the threshold 12 (75%) is calculated in the following manner.

If the threshold is set to 8 (50%) or more, skin color is likely to be on the ranging point of the ranging sensor 111.

However, in the case where there is a relative shift in the mounted positions of the photometric sensor 107 and the ranging sensor 111, the threshold has to be set at a rather high value according to the positional shift.

Figure 4G:
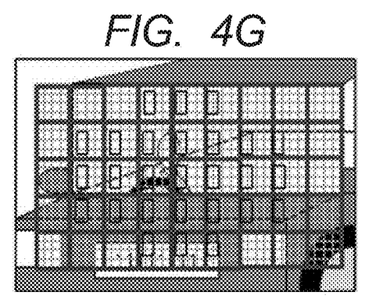

For example, in the case where, as in FIG. 4G, the ranging sensor is shifted to the left by one pixel group, the amount of shift is 4 (25%) in terms of area. Thus, the threshold 12 (75%) is calculated by adding the amount of shift in the area, 4 (25%), to the threshold 8 (50%).

The pixel groups, in both the scenes in FIGS. 4A and 5A, at a boundary of the vehicle body and the license plate which have been erroneously detected as skin color may be prevented by the threshold determination from being determined as the specific color blocks.

Also, in both FIGS. 4A and 5A, the face on the left side is at or below the threshold, and is not determined as a specific color block.

Here, in FIG. 4A, the face is on the ranging points in the center and the upper left, and the face can be focused on. However, in the case where a positional shift is present as in FIG. 4G, the face is not on the ranging points, and cannot be focused on. The face should not be determined as a specific color block because, as described above, it cannot be focused on due to the relative shift in the sensor mounted positions.

In the scene in FIG. 5A, the face on the right is determined as a specific color block 530.

Figure 5G:
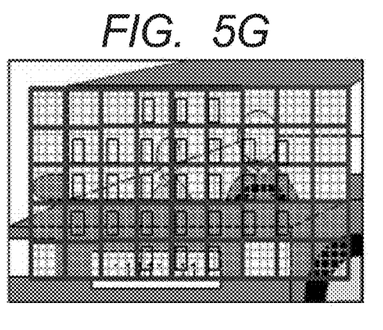

Here, even if a positional shift is caused, as in FIG. 5G, with respect to FIG. 5A, the face on the right may be focused on because the face is on the ranging point. The face should be determined as a specific color block because it can stably be focused on even if there is a relative shift in the sensor mounted positions.

In S305, the CPU 101 performs processing of focusing on the specific color by detecting the de-focusing quantity of a ranging point with respect to the block having the specific color in S304, driving the focus lens of the lens 200 through the LPU 201, and driving the focus lens to the detected defocus position.

Figure 5H:
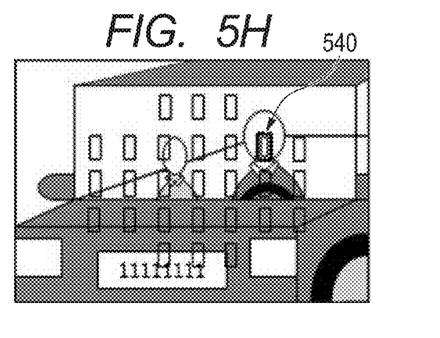

With respect to the scene in FIG. 5A, a ranging point 540 corresponding to the specific color block is illustrated in FIG. 5H.

Figure 4H:
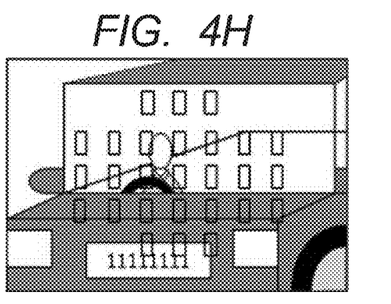

In FIG. 4H, although automatic focusing on the face cannot be performed, the variance in the focus due to the relative shift in the sensor mounted positions is suppressed.

In FIG. 5H, the face on the right can be automatically focused on. Also, even in the case where the mounted position of the ranging sensor 111 is shifted to the left by one pixel group, as in FIG. 5G, a ranging point is on the face on the right, and the face can be focused on.

By using the method described above, the imaging apparatus that automatically focuses on a specific color by using two sensors, the photometric sensor 107 and the ranging sensor 111, may perform automatic focusing where the variance in the focus due to a relative shift in the mounted positions of the sensors is suppressed.

The first embodiment has been described above.

Second Embodiment

The structure of a camera according to a second embodiment is the same as that of the camera illustrated in FIG. 1, and the flow of the photographing processing is the same as that of the flow chart illustrated in FIG. 2.

Figure 6:
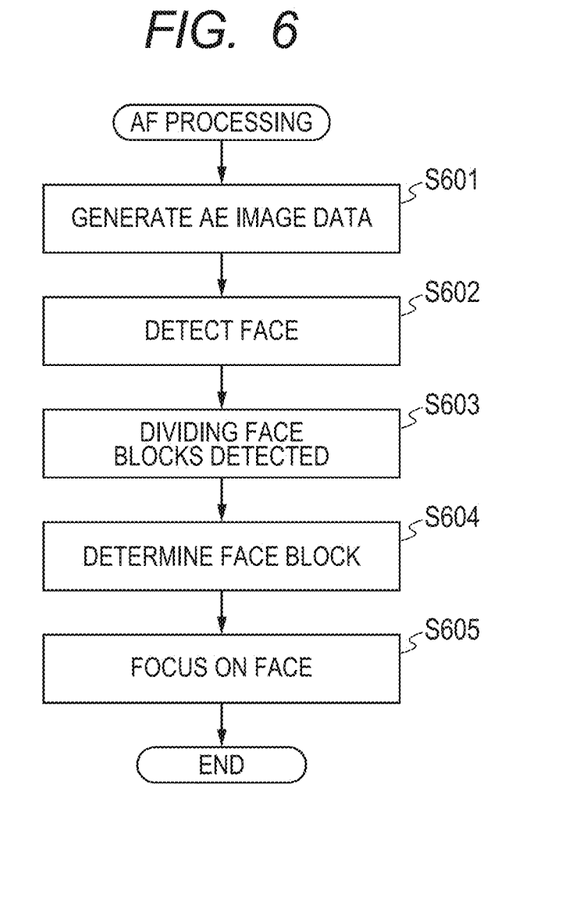
FIG. 6 is a flow chart for describing photographing processing by an imaging apparatus according to an embodiment of the present invention.

FIG. 6 is a flow chart for describing in detail driving of the photometric sensor 107 and the ranging sensor in the AF processing in S203 in FIG. 2.

The flow chart in FIG. 6 is described with reference to FIGS. 7A to 7H, and FIGS. 8A to 8H.

Figure 7A:
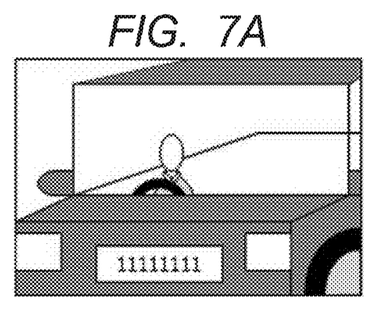
FIGS. 7A, 7B, 7C, 7D, 7E, 7F, 7G and 7H are explanatory diagrams for describing the flow chart in FIG. 6 for the imaging apparatus according to the embodiment of the present invention.
Figure 8A:
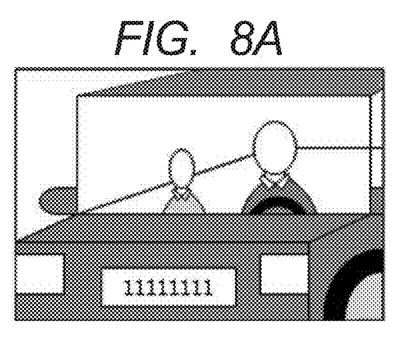
FIGS. 8A, 8B, 8C, 8D, 8E, 8F, 8G and 8H are explanatory diagrams for describing the flow chart in FIG. 6 for the imaging apparatus according to the embodiment of the present invention.

FIGS. 7A and 8A are diagrams illustrating examples of a photography scene.

Figure 7B:
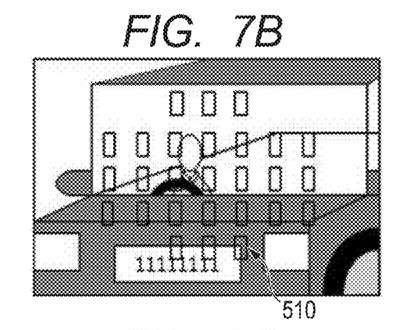
Figure 8B:
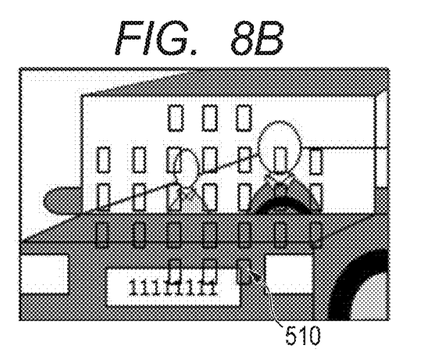

Discretely arranged ranging points 510 of the ranging sensor 111 are illustrated in FIGS. 7B and 8B with respect to the photography scenes in FIGS. 7A and 8A.

In S601, the CPU 101 performs accumulation for the photometric sensor 107, generates image data, and stores the same in the memory 102.

In S602, the CPU 101 performs face detection. For example, there is a method of using learning represented by a neural network or a support vector machine, or a method of performing template matching for parts in an image area which are physically characteristic in shape, such as the eyes and the nose, and extracting the parts. In addition, there is also a method of detecting an image feature value, such as the color of the skin or the shape of the eyes, and performing analysis by using a statistical method (for example, see Japanese Patent Application Laid-Open No. H10-232934 or Japanese Patent Application Laid-Open No. 2000-48184). The result of face detection is output as a face region where the face is present with respect to the pixels in the image data.

Figure 7C:
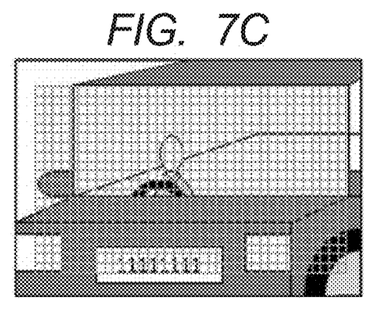
Figure 7D:
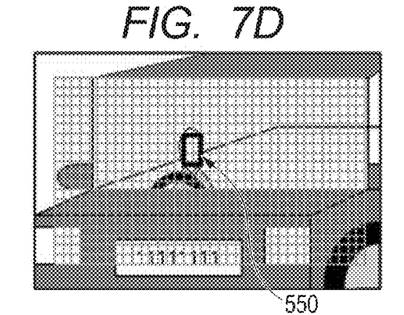
Figure 8C:
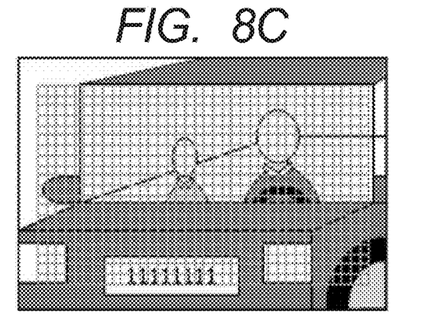
Figure 8D:
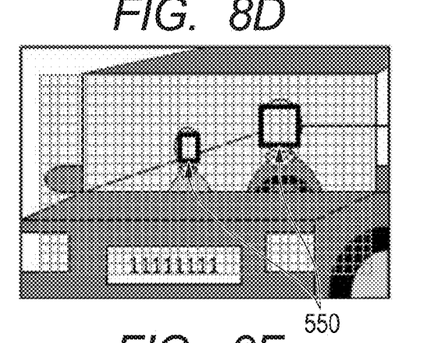

FIGS. 7C and 8C illustrate division into pixels, and FIGS. 7D and 8D illustrate face pixel groups 550.

Figure 7E:
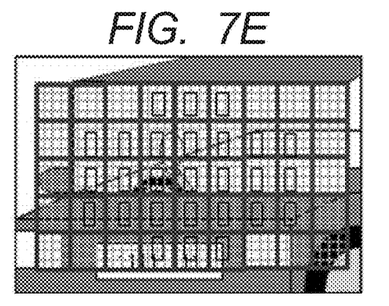
Figure 7F:
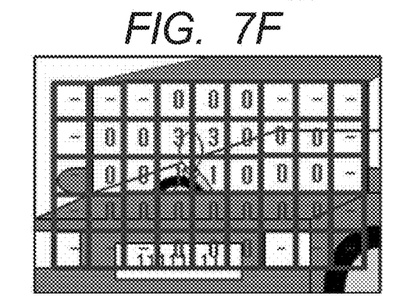
Figure 7G:
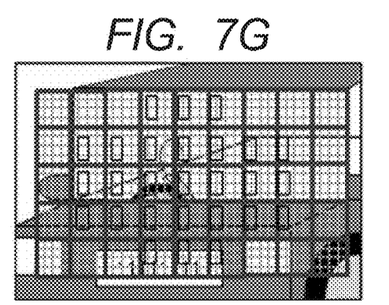
Figure 8E:
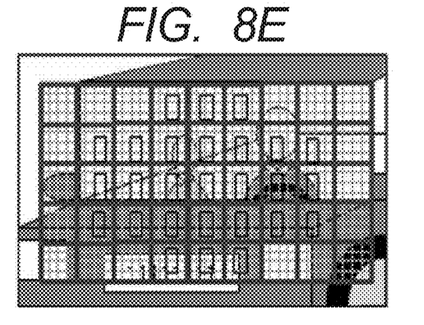
Figure 8F:
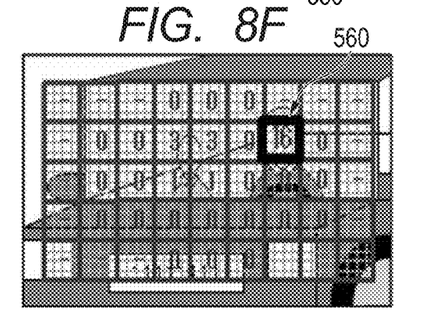
Figure 8G:
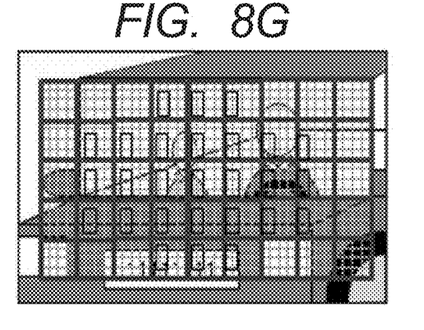

In S603, the CPU 101 divides the image data into blocks corresponding to the ranging points of the ranging sensor 111, and counts the number of pixels of the face regions in each block. FIGS. 7E and 8E illustrate division into blocks corresponding to the ranging points of the ranging sensor. In FIGS. 7F and 8F, the face regions in the blocks are counted.

In S604, the CPU 101 performs face block determination processing by comparing the number of counts calculated in S603 and a threshold, and determining whether a block is a block including the face. This determination processing is performed by determining whether the area occupied by the face in the block is at or greater than a predetermined proportion. In FIG. 8F, a block whose number of counts is 12 (75%) or more is detected as a face block 560 including the face.

Here, the threshold 12 (75%) is calculated in the same manner as in the first embodiment.

The faces on the left in the scenes in both FIGS. 7A and 8A are not determined as the face block due to the threshold determination.

In the scene in FIG. 8A, the face on the right is determined as the face block 560.

In S605, the CPU 101 performs processing of focusing on the face by detecting the de-focusing quantity of a ranging point with respect to the block including the face in S604, driving the focus lens of the lens 200 through the LPU 201, and driving the focus lens to the detected defocus position.

Figure 8H:
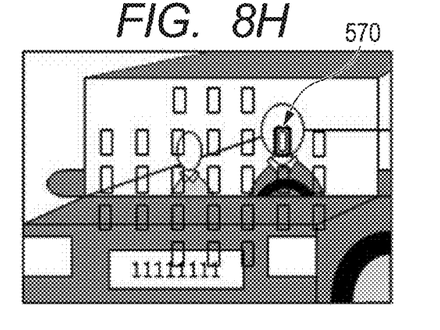

With respect to the scene in FIG. 8A, a ranging point 570 corresponding to the face block is illustrated in FIG. 8H.

Figure 7H:
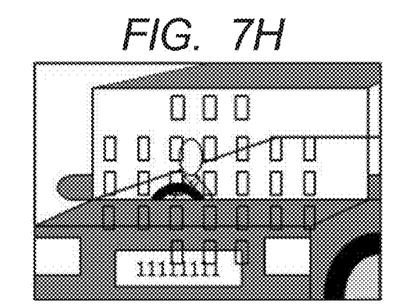

In FIG. 7H, the face cannot be automatically focused on, but focusing on the background of a small main object and variance in the focus due to a relative shift in the mounted positions of the sensors are suppressed.

In FIG. 8H, the face on the right may be automatically focused on. Also, even in the case where the mounted position of the ranging sensor 111 is shifted to the left by one pixel group, as in FIG. 8G, a ranging point is on the face on the right, and the face is focused on.

By using the method described above, the imaging apparatus that automatically focuses on a face by using two sensors, the photometric sensor 107 and the ranging sensor 111, may perform automatic focusing where the variance in the focus due to a relative shift in the mounted positions of the sensors is suppressed.

The second embodiment has been described above.

Figure 9:
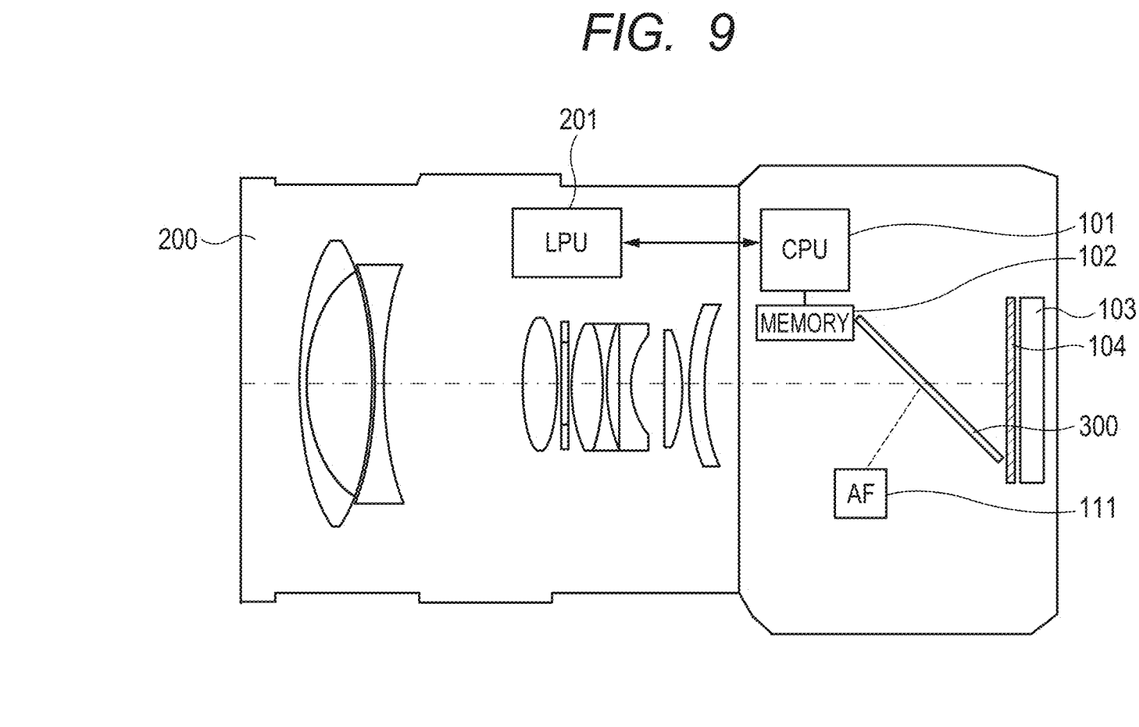
FIG. 9 is a block diagram illustrating an example structure of an imaging apparatus according to an embodiment of the present invention.

Additionally, the first and the second embodiments may be carried out by the structure illustrated in FIG. 9 instead of the structure of the imaging apparatus illustrated in FIG. 1.

In FIG. 9, the pentaprism 108, the photometric sensor 107 and the like in FIG. 1 are removed, and the half mirror 105 and the sub-mirror 110 are changed to a half mirror 300.

The half mirror 300 reflects a part of light entering from the lens 200 at the time of non-photographing, guides a part of light beams to the ranging sensor 111 inside a focal point detection circuit, and performs ranging. Also, a part of the light is transmitted, and a part of the light beams is guided to the imaging device 103, and an image of an object is formed.

Additionally, description of parts that are common between FIG. 9 and FIG. 1 is omitted.

In contrast to the structure in FIG. 1, the weight of the structure in FIG. 9 may be reduced by eliminating some parts. The function of the photometric sensor 107 is realized by the imaging device 103. The ranging sensor 111 is maintained for fast ranging processing.

In the case of the present structure, a specific color or a face may be detected by using the imaging device 103 instead of the photometric sensor 107, and focusing may be performed by the ranging sensor 111.

Heretofore, two preferable embodiments of the present invention have been described, but the present invention is not limited to these embodiments, and various modifications and alterations are possible within the scope of the invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-257710, filed Dec. 19, 2014, which is hereby incorporated by reference herein in its entirety.

What is claimed is:

1. An imaging apparatus including a photometric sensor and a ranging sensor, the apparatus comprising:
    a CPU, wherein the CPU is configured to:
        generate image data by using the photometric sensor,
        detect, from the image data generated by the photometric sensor, a region that includes an object,
        divide the image data into blocks corresponding to discretely arranged ranging points of the ranging sensor, and
        determine, for each block, a proportion of an area of the block that is occupied by the region that includes the object,
    wherein when a ranging point of the ranging sensor corresponds to a block where the proportion of the area of the block that is occupied by the region including the object is equal to or larger than a predetermined value, the CPU determines the object as being present in the ranging point and performs a focus processing to focus on the ranging point, and
    wherein when the ranging point of the ranging sensor corresponds to a block where the proportion of the area of the block that is occupied by the region including the object is smaller than the predetermined value, the CPU performs the focus processing without determining the object as being present in the ranging point.

2. The imaging apparatus according to claim 1, wherein the CPU detects, for each pixel group of the image data, whether a specific color is included, and detects a pixel group including the specific color as the region that includes the object.

3. The imaging apparatus according to claim 2, wherein the specific color is skin color.

4. The imaging apparatus according to claim 1, wherein the CPU detects a face from the image data, and detects a region where the face is detected as the region that includes the object.

5. The imaging apparatus according to claim 1, further comprising a half mirror configured to reflect a portion of light entering from a lens,
    wherein the light reflected by the half mirror enters the photometric sensor, and light that has passed through the half mirror enters the ranging sensor.

6. The imaging apparatus according to claim 1, comprising an imaging device sensor where exposure is performed according to an exposure control value that is calculated based on a photometric value of the photometric sensor.

7. A control method of an imaging apparatus including a photometric sensor and a ranging sensor, the method comprising:
    generating image data by using the photometric sensor;
    detecting, from the image data generated in the generating, a region that includes an object;
    dividing the image data into blocks corresponding to discretely arranged ranging points of the ranging sensor, and determining, for each block, a proportion of an area of the block that is occupied by the region that includes the object;

determining, when a ranging point of the ranging sensor corresponds to a block where the proportion of the area of the block that is occupied by the region that includes the object is equal to or larger than a predetermined value, the object as being present in the ranging point and performing a focus processing to focus on the ranging point; and performing, when the ranging point of the ranging sensor corresponds to a block where the proportion of the area of the block that is occupied by the region that includes the object is smaller than the predetermined value, the focus processing without determining the object as being present in the ranging point.

8. A non-transitory computer-readable storage medium storing a program for operating a computer to execute a control method of an imaging apparatus including a photometric sensor and a ranging sensor, wherein the program operates the computer to execute:

generating image data by using the photometric sensor;

detecting, from the image data generated in the generating, a region that includes an object;

dividing the image data into blocks corresponding to discretely arranged ranging points of the ranging sensor, and determining, for each block, a proportion of an area of the block that is occupied by the region that includes the object;

determining, when a ranging point of the ranging sensor corresponds to a block where the proportion of the area of the block that is occupied by the region that includes the object is equal to or larger than a predetermined value, the object as being present in the ranging point and performing a focus processing to focus on the ranging point; and performing, when the ranging point of the ranging sensor corresponds to a block where the proportion of the area of the block that is occupied by the region that includes the object is smaller than the predetermined value, the focus processing without determining the object as being present in the ranging point.

* * * * *